INVENTOR.
RAYMOND B. PETTIBONE
ATTORNEYS

Dec. 2, 1969

R. B. PETTIBONE 3,481,277

POWER TRANSMISSION

Filed Sept. 28, 1967

*INVENTOR.*
RAYMOND B. PETTIBONE
BY
*Van Meter and George*
ATTORNEYS

Dec. 2, 1969    R. B. PETTIBONE    3,481,277
POWER TRANSMISSION
Filed Sept. 28, 1967    3 Sheets-Sheet 3

INVENTOR.
RAYMOND B. PETTIBONE
BY
ATTORNEYS

United States Patent Office 3,481,277
Patented Dec. 2, 1969

3,481,277
POWER TRANSMISSION
Raymond B. Pettibone, Detroit, Mich., assignor to Sperry Rand Corporation, Troy, Mich., a corporation of Delaware
Filed Sept. 28, 1967, Ser. No. 671,256
Int. Cl. F04b 1/12; F16c 17/04
U.S. Cl. 103—162          9 Claims

ABSTRACT OF THE DISCLOSURE

A fluid pressure energy translation device having in combination a rotatable cylinder barrel with a plurality of pistons disposed for reciprocation within cylinders therein and cylinder ports communicating each cylinder successively with an inlet and an outlet port in a valve plate abutting the cylinder barrel, and a bearing ring, disposed between the peripheries of the cylinder barrel and valve plate, which is adapted for independent rotary motion relative to the cylinder barrel and valve plate.

Background of the invention

This invention relates to power transmissions, particularly to those of the type comprising two or more fluid pressure energy translating devices, one of which may function as a pump and the other as a fluid motor.

The invention is generally concerned with pumps and motors of the axial piston type, and in particular, the invention relates to an improvement in the construction of cylinder barrels as illustrated in the patent to Adolf Keel, No. 2,776,628.

In devices of this type, which comprise a revolving cylinder barrel having a plurality of parallel cylinders therein within which pistons are reciprocated by means of a swash plate device, it is customary to provide a rotary valve mechanism which is operated by the rotation of the cylinder barrel for the purpose of alternately connecting each cylinder bore with the inlet and outlet passages of the device. Many machines of this character utilize a plate valve formed by a flat surface of the cylinder barrel which runs in abutting and in fluid sealing relationship on a stationary flat valve plate. The plate type valve may be so constructed that the cylinder barrel is constantly pressed into engagement with the valve plate so that the clearance at the valve is automatically adjusted to take care of variations in oil viscosity and to compensate for wear. This is a distinct advantage and contributes much to the reliability and long life of devices employing a valve of this character.

In devices of this type operating at extremely high speeds, considerable difficulty has been experienced in the past in attempting to provide satisfactory conditions at the running surfaces between the cylinder barrel and valve plate. At these high operating speeds, the increase in the peripheral velocity between the cylinder barrel and valve plate has caused a considerable increase in the temperature at the bearing surfaces resulting in excessive wear and galling of the surfaces and a corresponding decrease in the performance, reliability, and long life of the device.

Summary of the invention

This invention comprises a bearing ring for use in a fluid pressure energy translating device of the axial piston type wherein the bearing ring is designed to cooperate with the peripheral bearing surfaces of the cylinder barrel and valve plate while spinning independently of the same.

It is therefore an object of this invention to provide in a rotary fluid pressure energy translating device of the axial piston type, an improved cylinder barrel construction which is readily adapted to low cost manufacturing.

It is another object of this invention to provide in a rotary pressure energy translating device of the axial piston type an improved cylinder barrel construction which will reduce the relative peripheral velocity between the cylinder barrel and valve plate resulting in a decrease in the temperature build-up between the same.

It is a further object of this invention to provide in a rotary fluid pressure energy translating device an improved cylinder barrel construction which will reduce excessive surface wear and galling between the cylinder barrel and valve plate bearing surfaces resulting in greater reliability and long life while operating at extremely high speeds.

Further objects and advantages of the present invention will be apparent from the following description, reference being made to the accompanying drawings wherein a preferred form of the invention is clearly shown.

In the drawings

Figure 1:
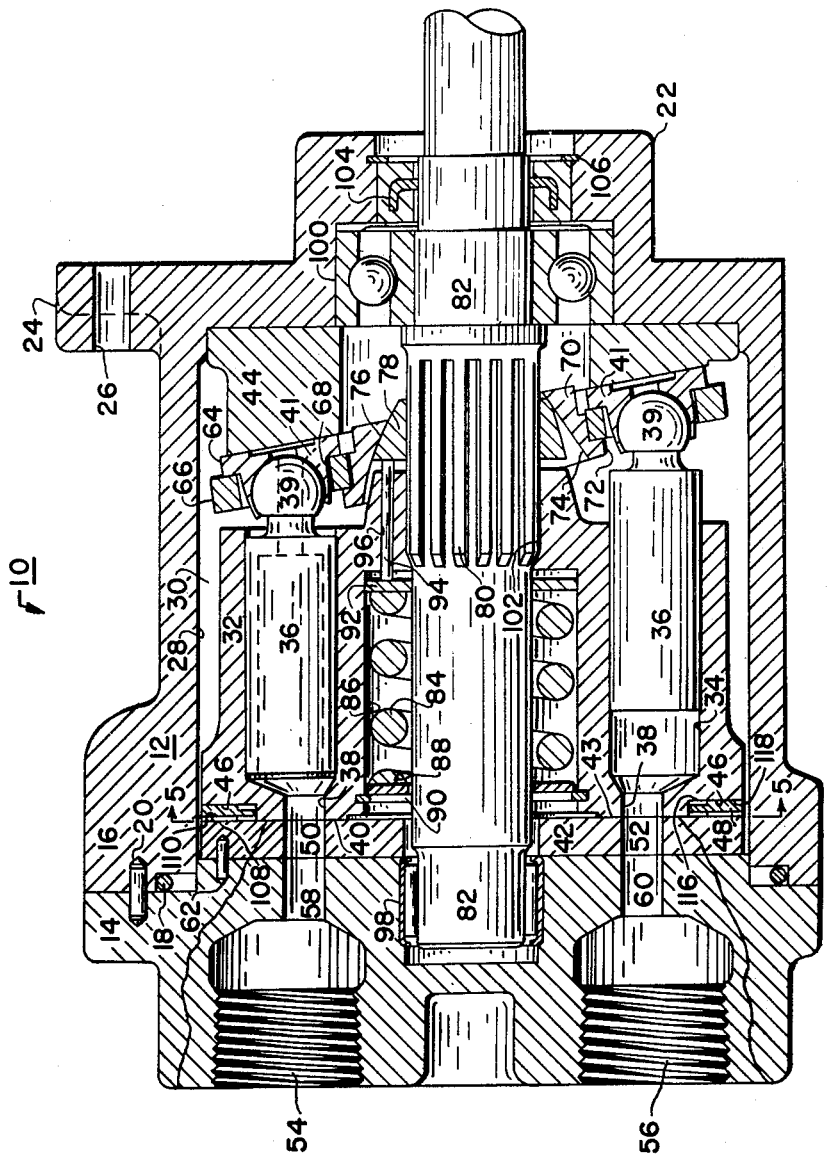
FIG. 1 is a longitudinal transverse section of a fluid pressure energy translating device incorporating a preferred form of the present invention.

Turning now to the figures, and especially FIG. 1, there is shown a pump 10 of the cantilever piston type. The housing 12 of the pump 10 comprises two parts 14 and 16 secured together by bolts, not shown. An O ring seal 18 insures a fluid tight juncture of the two parts and the dowel pin 20 maintains proper angular alignment between them. Body 12 includes a pilot portion 22 and a mounting flange 24 having mounting holes 26 therein.

Figure 6:
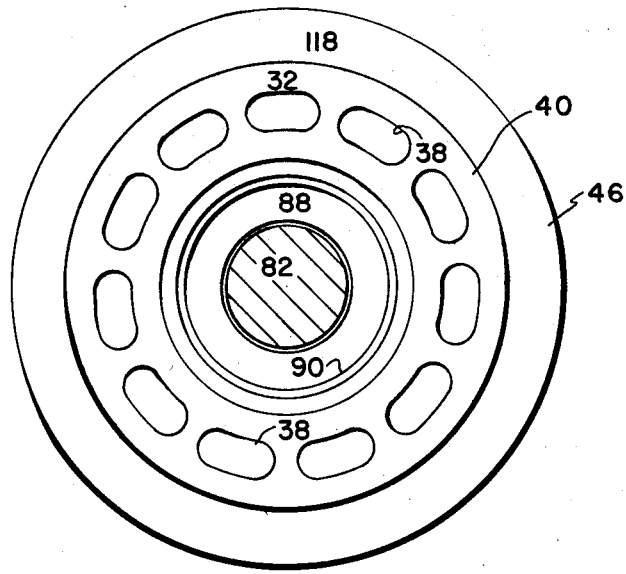
FIG. 6 is a front elevational view similar to that of FIG. 5, but for purposes of illustration, the bearing member is removed.

A bore 28 in housing 12 provides a chamber 30 having a cylinder barrel 32 positioned therein. Cylinder barrel 32 is provided with a plurality of piston cylinders 34 each having a piston 36 axially slidable therein and cylinder ports 38 for communicating each of the cylinders with the front face 40 of the cylinder barrel. Pistons 36 have spherical ends 39 on which are swaged the socketed shoes 41. The cylinder barrel 32 is positioned axially between valve plate 42 and the inclined thrust plate 44. A recess 46 located on the face 40 and circumscribing the cylinder ports 38 has preferably its outer diameter extending to the outer periphery of the cylinder barrel as shown in FIG. 6, and is adapted to accommodate a bearing member or ring 48, the purpose of which will be explained hereinafter. Valve plate 42 may be the type described in the patent to Harry F. Vickers et al., No. 2,313,407, and serves in a well-known manner to provide properly phased connections between cylinder ports 38 and the valve plate arcuate ports 50 and outlet port 52. The cylinder ports 38 will communicate successively with the arcuate ports as the cylinder rotates. The valve plate ports 50 and 52 are connected to external inlet and outlet connection ports of the device indicated at 54 and 56 by means of passages 58 and 60 respectively. The dowel pin 62 maintains proper angular alignment between the valve plate 40 and the body 14 and further prevents the valve plate 40 from rotating.

Piston shoes 41 have outwardly extending flanges 64 which are contacted by an annular cage 66 with holes 68 corresponding to each piston 36. A sleeve 70 is provided with a shoulder 72 to contact cage 66 and has a truncated conical bore 74 therein. Conical bore 74 contacts the spherical outer surface 76 of the collar 78 which is provided with a female spline to engage a male spline 80 in the drive shaft 82.

A spring 84 is positioned in a central recess 86 in cylinder barrel 32. One end of spring 84 acts against a washer 88 and a snap ring 90 in cylinder barrel 32. The other end of spring 84 is exerted against a washer 92 which abuts a plurality of push rods 94 extending axially through hole 96 in cylinder barrel 32 into engagement with collar 78. Force exerted by spring 84 thus brings the face 40 of cylinder barrel 32 into engagement with the face 43 of the valve plate 42 and also biases the shoes 41 into engagement with the thrust plate 44.

The drive shaft 82 is supported between bearing 98 and 100 and is effective to transmit torque from a prime mover, not shown, to the cylinder barrel through a driving connection at 102. A conventional shaft seal is provided at 104 and is retained in position by snap ring 106.

Figure 3:
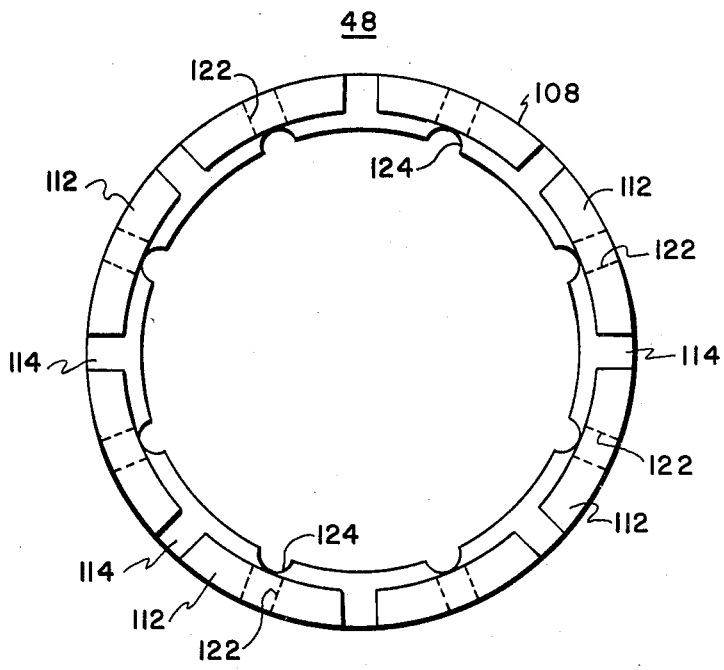
FIG. 3 is a front elevational view of the bearing member illustrated in FIG. 2.
Figure 2:
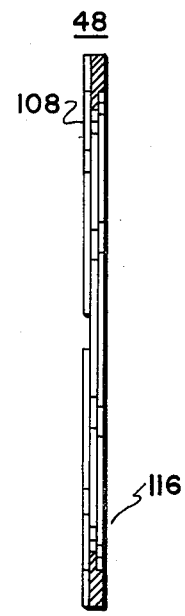
FIG. 2 is a partial sectional view of the independent bearing member.
Figure 4:
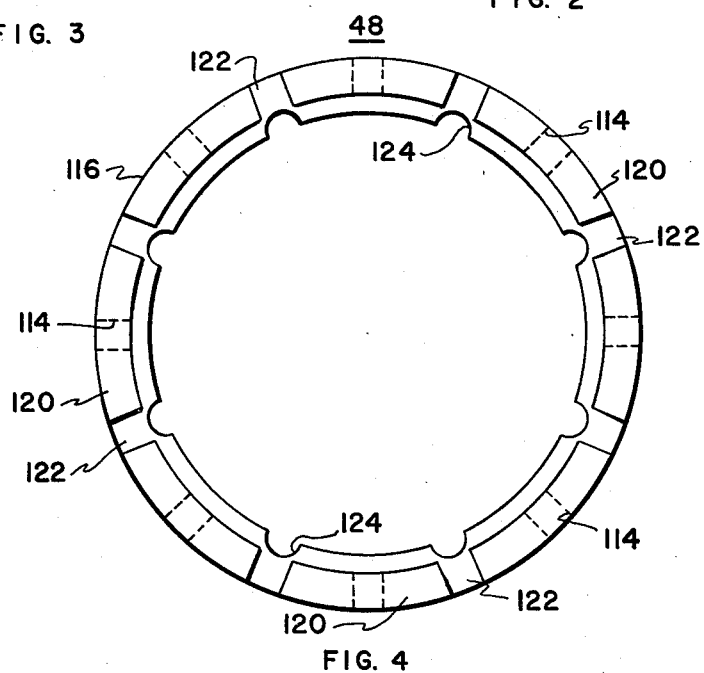
FIG. 4 is a rear elevational view of the bearing member illustrated in FIG. 2.
Figure 5:
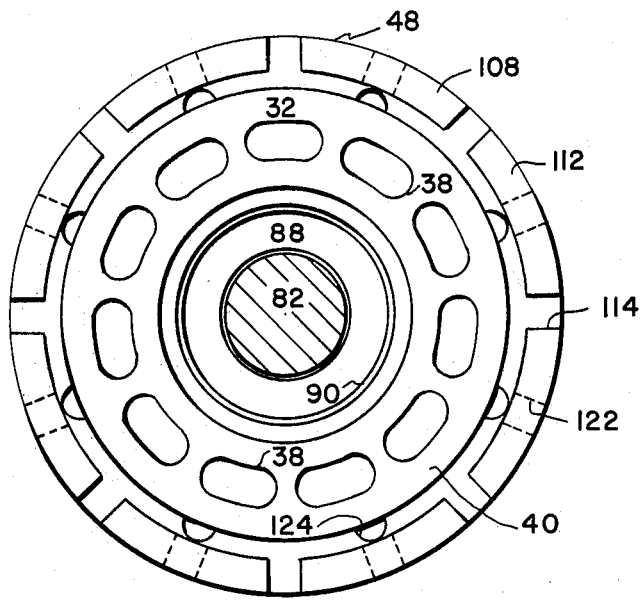
FIG. 5 is a front elevational view taken on line 5—5 of FIG. 1 illustrating the cylinder barrel and bearing member faces.

Referring now to FIGS. 2, 3, and 4, the construction of the two opposite faces of the bearing member 48 is clearly shown. FIG. 3 illustrates the lefthand face 108 of the member shown in FIGS. 1 and 2, that is, the surface which abuts against the valve plate face 43 along an angular bearing surface 110 (FIG. 1), which circumscribes the valve plate ports 50 and 52. It will be seen that this face 108 is provided with a plurality of bearing pads 112 separated by radial grooves 114. FIG. 4 illustrates the righthand face 116 of the member shown in FIGS. 1 and 2, that is, the surface which abuts against an angular bearing surface 118 (FIG. 5) formed in the recess 46 on cylinder barrel face 40 and circumscribes the cylinder ports 38. The face 116 also has a plurality of bearing pads 120 separated by radial grooves 122. The opposite faces 108 and 116 of the member 48 are in fluid communication by means of a plurality of axial grooves located on the inner periphery of the member 48 and are indicated generally by the number 124. The bearing pads 112 and 120 are generally referred to as "Kingsbury Pads" and function in a manner well-known in the art.

As herebefore mentioned, the member 48 is positioned in the recess 46 on the front face 40 between the annular bearing surface 118 of the cylinder barrel 32 and the annular bearing surface 110 formed on the valve plate 42, and is adapted for independent rotation relative to both the cylinder barrel bearing surface 118 and the valve plate bearing surface 110.

In operation, the device functions as a pump in the manner well-known to the art. As aforementioned, the cylinder barrel bearing surface 110 abuts the bearing member 48 and is supported thereby and the cylinder barrel face 40 does not make contact with the valve plate face 43. A running clearance between the cylinder barrel face 40 and the valve plate face 43 is maintained by the difference in width between the bearing member 48 and the cylinder barrel recess 46 with the bearing member being slightly wider. A clearance of .0005 inch between the valve plate and cylinder barrel should be sufficient, however, the amount of clearance will vary depending upon the leakage requirement necessary for the particular speed, temperature, pressure and fluid at which the device will be operated. It will be seen that leakage flowing radially outward from the cylinder ports 38 is carried across the cylinder face 40 and into the radial grooves 114 for the purpose of lubricating the bearing pads 112 on the lefthand face 108 of the bearing member. A plurality of axial grooves 124, located on the inner periphery of the bearing member 48 supply fluid to the grooves 122 and lubricate pads 120 in the same manner. The leakage flows past the pads to the outer periphery of the cylinder barrel 32 and into the chamber 30. As herebefore mentioned, the bearing member 48 is capable of spinning independent of the rotating cylinder block. The peripheral velocity of the member will depend upon the friction and viscous drag between it, the cylinder barrel bearing surface 118, and the valve plate bearing surface 110; hence, the relative velocity of the bearing member will be at some intermediate value of the cylinder barrel speed.

Any tendency for seizure or scoring of one set of bearing surfaces will reduce their relative motion and at the same time increase the relative velocity between the other set of bearing surfaces to compensate. The reduced relative velocity between the two sets of surfaces will cause less of a temperature build-up resulting in a corresponding reduction in surface wear and galling between the cylinder barrel and valve plate faces.

It will thus be seen that the present invention provides a rugged, compact and low cost construction for use in a fluid pressure energy translating device and in which its construction allows devices embodying the invention to operate at much higher speeds than conventional devices of the type herebefore mentioned, yet minimizing excess wear and galling while providing utmost efficiency, reliability, and long life.

While the form of embodiment of the invention as herein disclosed constitutes a preferred form, it is to be understood that other forms might be adapted, all coming within the scope of the claims which follow.

What is claimed is as follows:

1. In a fluid pressure energy translating device including a rotatable cylinder barrel, said barrel having a plurality of pistons with inner ends disposed for reciprocation within cylinders in said barrel;
   cylinder ports communicating each of said cylinders with one end of said cylinder barrel;
   a first annular bearing surface circumscribing said cylinder ports;
   a valve plate having arcuate passages therethrough, said valve plate and barrel being disposed for relative rotary movement with said cylinder ports communicating successively with said arcuate passages;
   a second annular bearing surface circumscribing said arcuate passages;
   means forming an annular bearing ring, the opposite sides of said ring being in slidable abutment respectively with said first and said second bearing surfaces and rotatably movable relative to said first and said second bearing surfaces, said ring circumscribing said cylinder block and being of such a width as to separate said cylinder barrel ports and said valve plate arcuate passages by a predetermined amount.

2. A combination as in claim 1 wherein said annular bearing ring has, on one side thereof, a plurality of bearing pads separated by radial grooves.

3. In a fluid pressure energy translating device including a rotatable barrel, said barrel having a plurality of pistons with inner ends disposed for reciprocation within cylinders in said barrel; cylinder ports communicating each of said cylinders with an end face of said barrel;
   an annular recess formed in said end face and circumscribing said cylinder ports, said recess having a first bearing surface formed therein;
   a valve plate having a face having arcuate passages therethrough, said valve plate face in said cylinder barrel face being disposed for relative rotary movement with said cylinder ports communicating successively with said arcuate passages;
   means preventing rotation of said valve plate;
   a second bearing surface formed on said valve plate face, said surface circumscribing said arcuate passages; and,
   means forming an annular bearing ring having on one side thereof a plurality of bearing pads separated by radial grooves, said ring being disposed in said recess between said first and second bearing surfaces and adapted for rotary motion relative to said first and said second bearing surfaces.

4. A combination as in claim 3 wherein an outer diameter of said annular recess formed in said end face and circumscribing said cylinder ports extends to the outer periphery of said cylinder ports.

5. A combination as in claim 4 wherein the width of said bearing ring is greater than the depth of said recess wherein said bearing ring separates said cylinder block ports from said valve plate arcuate passages by a predetermined amount.

6. A combination as in claim 3 wherein said second bearing surface is diametrically opposed to said first bearing surface.

7. A combination as described in claim 3 wherein said annular bearing ring comprises a plurality of bearing pads separated by radial grooves, said pads and grooves being positioned on both faces of said ring and adapted to abut said first and second bearing surfaces for rotary motion relative to said surfaces.

8. A fluid pressure energy translating device including a housing having a cylinder barrel, a plurality of pistons with inner ends disposed for reciprocation with cylinders in said barrel and with outer ends protruding from one end of said barrel, an inclined cam plate facing said outer piston ends, a bearing surface on said cam plate, the outer ends of said pistons having bearing means being adapted to slidably follow said bearing surface, cylinder ports communicating each of said cylinders with the other end of said cylinder barrel, arcuate passages formed in said housing, means mounting said cylinder barrel for rotary movement relative to said arcuate passages with said cylinder ports communicating successively with said arcuate passages; that improvement which comprises a first annular bearing surface circumscribing said cylinder ports, a second annular bearing surface circumscribing said arcuate passages, and means forming an annnular bearing ring the opposite sides thereof being in slidable abutment respectively with said first and said second bearing surfaces and adapted for rotary motion relative to said first and said second surfaces, said ring circumscribing said valve plate and said ring circumscribing said cylinder ports and being of such a width that the same separates said cylinder ports and said arcuate passages by a predetermined amount.

9. A combination as in claim 8 wherein said annular bearing ring has, on one side thereof, a plurality of bearing pads separated by radial grooves.

References Cited

UNITED STATES PATENTS

| | | | |
|---|---|---|---|
| 1,924,629 | 8/1933 | Thoma | 103—162 |
| 2,298,850 | 10/1942 | Vickers | 103—162 |

FOREIGN PATENTS

| | | |
|---|---|---|
| 716,871 | 8/1965 | Canada. |
| 1,208,256 | 2/1960 | France. |

ROBERT M. WALKER, Primary Examiner

U.S. Cl. X.R.

308—237